(12) United States Patent
Kolb

(10) Patent No.: US 12,292,082 B2
(45) Date of Patent: May 6, 2025

(54) BEARING RING WITH SEALING DISC

(71) Applicant: Schaeffler Technologies AG & Co. KG, Herzogenaurach (DE)

(72) Inventor: Dietmar Kolb, Oberthulba (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 191 days.

(21) Appl. No.: 18/016,031

(22) PCT Filed: Jun. 15, 2021

(86) PCT No.: PCT/DE2021/100506
§ 371 (c)(1),
(2) Date: Jan. 13, 2023

(87) PCT Pub. No.: WO2022/012710
PCT Pub. Date: Jan. 20, 2022

(65) Prior Publication Data
US 2023/0366435 A1   Nov. 16, 2023

(30) Foreign Application Priority Data

Jul. 15, 2020  (DE) .......................... 102020118645

(51) Int. Cl.
*F16C 23/08* (2006.01)
*F16C 33/78* (2006.01)

(52) U.S. Cl.
CPC ........ *F16C 23/086* (2013.01); *F16C 33/7806* (2013.01); *F16C 33/7886* (2013.01)

(58) Field of Classification Search
CPC ................ F16C 33/7806; F16C 33/783; F16C 33/7886; F16C 33/7889
See application file for complete search history.

(56) References Cited

U.S. PATENT DOCUMENTS 4,687,350 A * 8/1987 Vogt .................... F16C 33/7886
384/481

FOREIGN PATENT DOCUMENTS

| CN | 201651046 U | 11/2010 |
|----|---|---|
| CN | 110985532 A | 4/2020 |
| DE | 102007036891 | 2/2009 |
| DE | 102010050721 | 5/2012 |
| DE | 102012207745 | 11/2013 |
| DE | 212014000158 | 4/2016 |
| DE | 60306638 | 6/2017 |
| DE | 102018102198 B4 | 1/2021 |

(Continued)

*Primary Examiner* — James Pilkington
(74) *Attorney, Agent, or Firm* — Volpe Koenig

(57) ABSTRACT

A bearing, in particular to a self-aligning roller bearing, with a fastener of a sealing disc, which fastener increases the load-bearing strength. The bearing includes a bearing ring with an annular sealing disc which is connected to one of the two bearing ring end surfaces by a fastener which have a shank and a head, which has an enlarged diameter with respect to the shank, and the respective shanks reach through the bores which are made in the respective end surface. Here, the annular surfaces have a cylindrical contour, with the result that the other annular surface provides a raceway, wherein the raceway has a spherical contour, and the bore center axis of each bore in the bearing ring and in the sealing disc has an engaged profile which converges onto the cylindrical contour of the one annular surface.

9 Claims, 4 Drawing Sheets

(56) References Cited

FOREIGN PATENT DOCUMENTS

| JP | 2012219817 A | | 11/2012 | | |
|---|---|---|---|---|---|
| JP | 2014025487 A | * | 2/2014 | .......... | F16C 33/7813 |
| WO | WO-2013007545 A1 | * | 1/2013 | ............. | B63B 39/06 |
| WO | 2013007545 | | 10/2013 | | |
| WO | WO-2015012337 A1 | * | 1/2015 | ............ | F16C 23/086 |

\* cited by examiner

BEARING RING WITH SEALING DISC

CROSS-REFERENCE TO RELATED APPLICATIONS

This application is the U.S. National Phase of PCT Appln. No. PCT/DE2021/100506, filed Jun. 15, 2021, which claims the benefit of German Patent Appln. No. 102020118645.2, filed Jul. 15, 2020, the entire disclosures of which are incorporated by reference herein.

TECHNICAL FIELD

The present disclosure relates to a bearing, in particular to a self-aligning roller bearing, with a fastener of a sealing disc, which fastener increases the load-bearing strength.

BACKGROUND

Bearing rings with different recesses for accommodating bearing seals are known from the prior art. Furthermore, for particular requirements, screw fastenings for seals are known for special types of bearing, such as spherical or self-aligning roller bearings.

EP 2 729 712 B1 discloses a spherical roller bearing for a fin stabilizer on a ship, which represents a sealing arrangement screwed onto the bearing ring for the lateral sealing of the rolling element chamber. This is characterized in that it has a second sealing section which is arranged on the seal support section. However, only a screw arrangement of the seal parallel to the outer contour of the roller bearing is shown here.

DE 10 2007 036 891 A1 discloses a bearing for a main shaft of a wind turbine, wherein the bearing comprises at least one spherical roller bearing. Sealing means for sealing a chamber containing the rollers of the spherical roller bearing are arranged directly on the rings in the spherical roller bearing. The sealing means are inserted into the outer rings and are designed to be corrugated in a longitudinal section along the axis of rotation.

DE 60306638 T2 relates to a sealed spherical roller bearing for a swing shaft for a dragline excavating device. The side of the spherical roller bearing has a contact lip seal support which carries a contact lip seal, wherein the contact lip seal support is screwed to the outer ring of the spherical roller bearing. The contact lip seal, together with a seal support ring that is arranged adjacent to the inner ring, forms a sealing region that seals the rolling element chamber.

SUMMARY

The present disclosure is based on the object of providing a roller bearing which has been developed further than the prior art and which has a fastening means for screwed sealing discs which is improved in terms of load-bearing strength.

In the case of roller bearings with bearing rings and rolling elements with a spherical contour, such as self-aligning roller bearings, the distance between the seal fastening screw bore and the raceway is usually small. As a result, the load-bearing strength in these regions is severely limited. Furthermore, this asymmetrical design, i.e., not parallel to the rolling element axis, of the fastening bore during heat treatment, for example during induction hardening, can lead to stress cracks during the cooling process. Thus far, this can only be counteracted by using particularly strong bearing rings or a lower hardening depth, which requires a lot of material and installation space.

According to the disclosure, the object is achieved by a bearing ring having one or more of the features described herein. The bearing ring comprises an outer and an inner annular surface, two end surfaces and an annular sealing disc which is connected to one of the two end surfaces, wherein fastening means which have a shank and a head, which has an enlarged diameter with respect to the shank, and the respective shanks reach through the bores which are made in the respective end surface and the sealing disc connected to it, wherein the annular surfaces have a cylindrical contour, so that the other annular surface provides a raceway, wherein the raceway has a spherical contour and the bore center axis of each bore in the bearing ring and in the sealing disc has an engaged profile which converges onto the cylindrical contour of the one annular surface.

In a preferred embodiment, the radial distance A between the bore center axis and the spherical contour is essentially the same size. This has the advantage that the distance between the bore center and the rolling element raceway is essentially the same and the stress distribution is therefore particularly uniform. This is also an advantage with regard to internal stresses that occur in the component, both before an optional hardening process and during use. The bearing ring is preferably either an outer ring or an inner ring of a roller bearing.

In an advantageous embodiment, screws are used as fastening means, wherein the bores in the side surfaces of the respective bearing ring are threaded bores. It is also conceivable for bolts or rivets to be provided as fastening means.

It is further preferable if the bores in the sealing disc are provided with a collar which extends radially to the bore center axis and forms an angle of 90° with the bore center axis, which collar divides each bore into a first section, with a large bore diameter, and a second section, with a smaller bore diameter.

The solution to the problem according to the disclosure is particularly preferable for use with self-aligning roller bearings, as these are weakened according to the current prior art due to their structure through drilled bores parallel to the lateral outer ring surface both during hardening processes and during use due to a loss of load-bearing strength of the raceway.

BRIEF DESCRIPTION OF THE DRAWINGS

The preferred embodiments are explained in more detail below with reference to the attached drawings.

In the figures.

DETAILED DESCRIPTION

Figure 1:
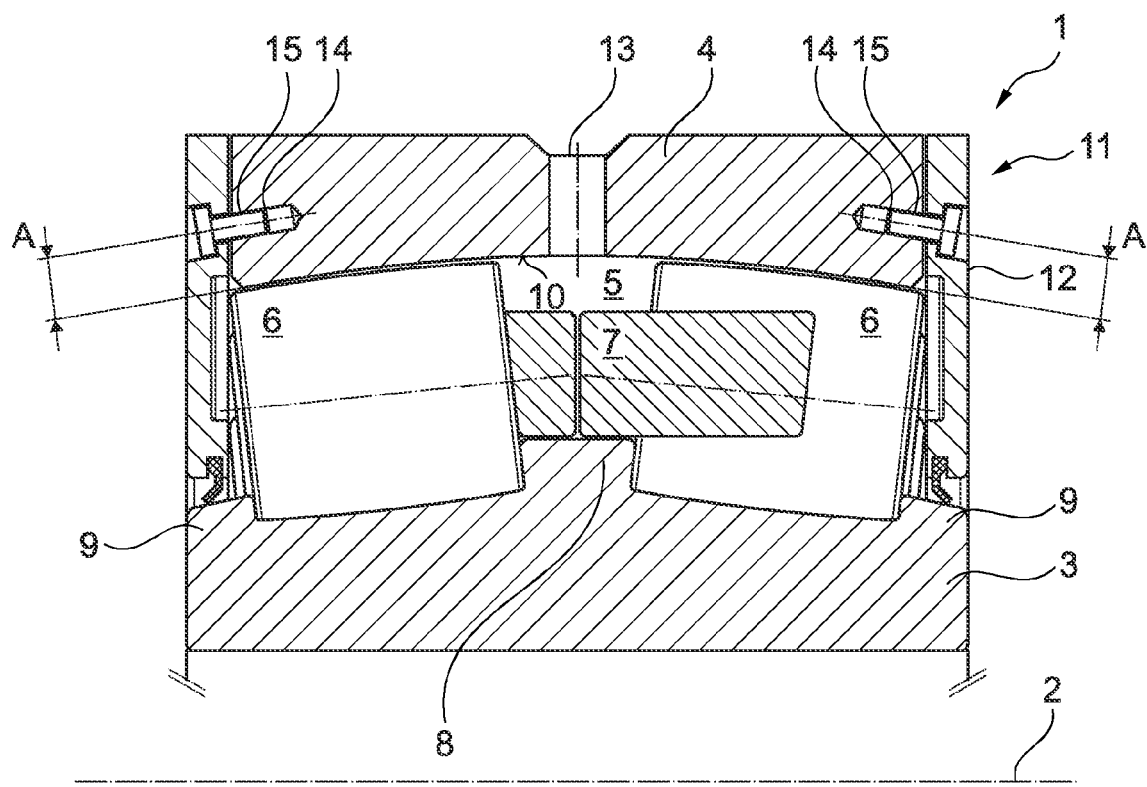
FIG. 1 shows a schematic longitudinal section through a self-aligning roller bearing as an exemplary embodiment of the disclosure.

In FIG. 1, a self-aligning roller bearing 1 is shown in a schematic longitudinal sectional view along an axis of rotation 2 of the self-aligning roller bearing 1. The self-aligning roller bearing has an inner ring 3 and an outer ring 4 which together form a rolling element chamber 5 in which two rows of rolling elements 6 are arranged in a cage 7. The rolling elements 6 are designed as barrel rollers. The inner ring 3 is designed as a solid, one-piece ring and has an integrated and/or molded central rim 8 and two integrated and/or molded lateral rims 9. Raceways for the rolling elements 6 run between the central rim 8 and the lateral rims 9. The outer ring 4 is also formed in one piece and has a hollow spherical shaped common raceway 10 for the rolling elements 6. Due to the roller geometry and the raceway geometry, the self-aligning roller bearing 1 is able to compensate for misalignments by tilting the inner ring 3 and outer ring 4. In the center of the outer ring 4 there is a lubrication bore 13 which allows lubricating grease to be pressed into the rolling element chamber 5. A sealing arrangement 11 is placed on the end face in each case, which seals off the rolling element chamber 5 from the environment. The sealing arrangement 11 comprises a seal support section 12 which is designed as an annular disc or has a corresponding section and extends from the radial outside of the outer ring 4 into the rolling element chamber 5. Except for the seal receptacle, the seal support section is designed to be planar or flat. An elastomer which seals the bearing interior can be located on the radial inner edge of the seal support section 12. It is also conceivable to provide different sealing materials. For example, the seal can be made entirely or partially of elastomer, be reinforced with metal, or be made entirely of a metallic material. This would be based on embodiments of centrifugal discs. The seal support section 12 is oriented in such a way that it prevents contamination from penetrating from the outside, while allowing lubricating grease to escape—for example when fresh lubricating grease is pressed into the lubrication bore 13.

The free end of the seal support section 12 can rest radially on the inner side on the lateral rims 9 or be at a small distance from the escape of lubricant during relubrication. It is also conceivable to provide a labyrinthine configuration of the seal support section in the region of the relative movement. The seal support section 12 can be made rigid, in particular from metal, for example steel, as an elastomer-metal composite or as a polymer, and have a material thickness of at least 0.5 mm, preferably at least 2 mm, so that the choice of material, material thickness and the constructive distribution results in a very rigid construction. In the axial extension along the axis of rotation 2, the outer ring 4 is designed to be narrower than the inner ring 3 or has a corresponding recess. The recessed axial region is occupied by the sealing arrangement 11 so that the self-aligning roller bearing 1 terminates flush with the inner ring 3 in the axial direction. By reducing the axial extent of the outer ring 4, the self-aligning roller bearing 1 can be exchanged for another bearing which has the same axial dimensions as the inner ring 3, since the self-aligning roller bearing 1 is designed to not require additional installation space.

For secure attachment of the sealing arrangement 11, in particular the seal support section 12, to the outer ring 4, the self-aligning roller bearing 1 has a peripheral row of cylindrical fastening means 14, which are inserted through openings in the seal support section 12 into bores 15 in the outer ring 4. In order to enable easy disassembly, for example for inspection, screws that engage in corresponding threaded bores in the bearing ring are suitable as fastening means. However, other designs such as bolts are also conceivable.

In the axially outer region, the seal support section 12 rests partially, in a region provided for this purpose, or over its entire surface on the end face of the outer ring 4. The bore center axis of each bore in the bearing ring and in the sealing disc has an inclined course that runs towards the cylindrical contour of an annular surface. This allows for an increased load-bearing strength of the raceway compared to designs known from the prior art. The radial distance A between the bore center axis and the spherical contour is essentially the same size, which, according to the invention, has the advantage that, due to the same wall thickness in the region of the raceway, there is particularly uniform cooling during a hardening process and thus the tendency to crack is particularly low.

The illustration also shows that the bores in the sealing disc are provided with a collar 16 which extends radially to the bore center axis and forms an angle of 90° with the bore center axis, which collar divides each bore into a first section, with a large bore diameter, and a second section with a smaller bore diameter.

Figure 2:
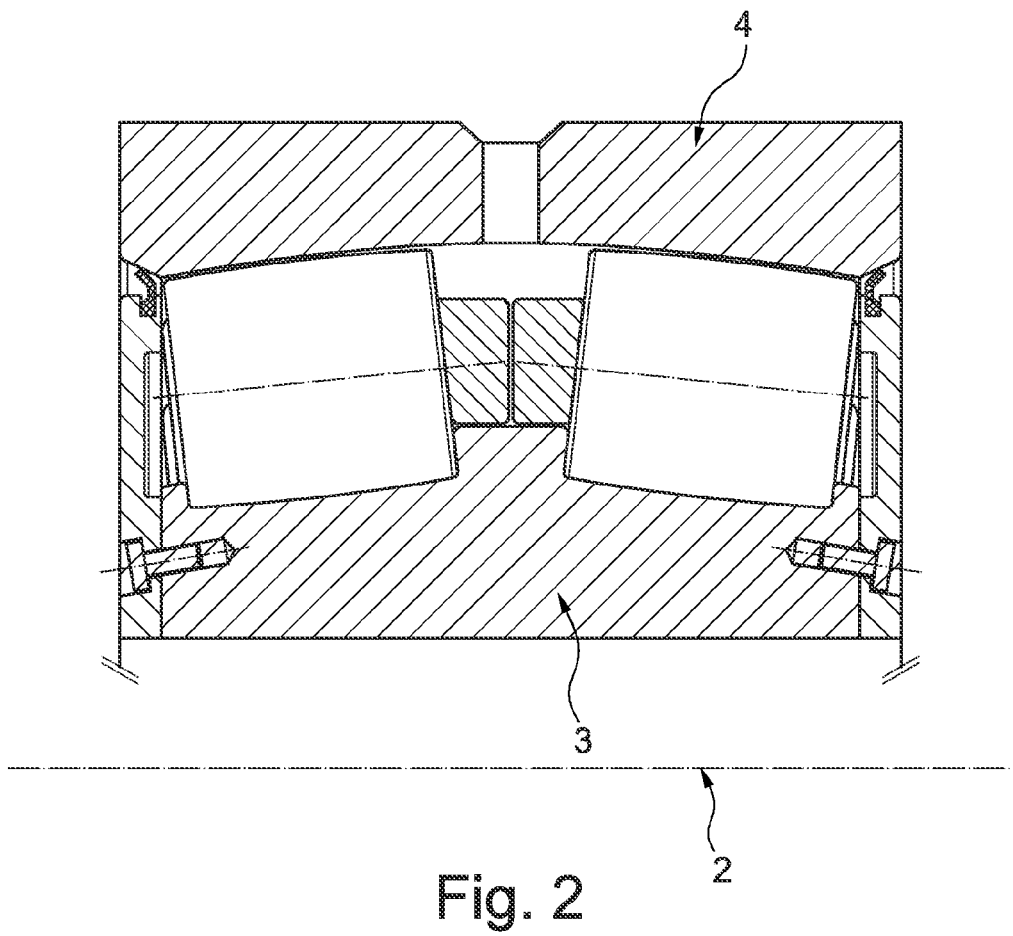
FIG. 2 shows a schematic longitudinal section through a self-aligning roller bearing as a further exemplary embodiment of the disclosure.

FIG. 2 shows a further embodiment, in which the fastening of the seal support section 12 is located on the inner ring of a roller bearing. This is particularly suitable for applications in which splash or condensation water can form inside the bearing or the ingress of media from the environment is unavoidable. Due to the design shown, this media does not collect in the lower region of the bearing between the inner ring and the seal, but can escape again on the lower side as a result of gravity.

Figure 3:
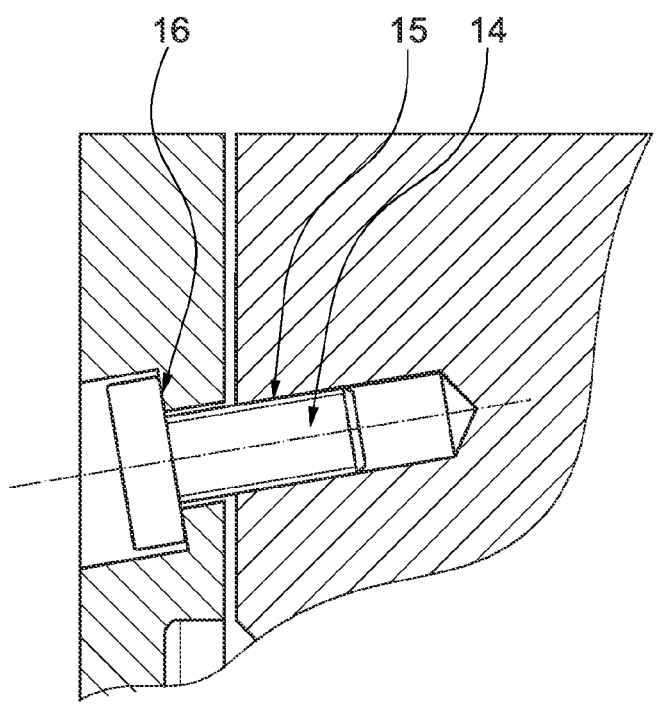
FIG. 3 shows a section through the bore region clarifying the disclosure.

FIG. 3 shows an embodiment of the sealing disc fastening in a detailed sectional view. It shows the collar, which extends radially to the bore center axis and forms an angle of 90° with the bore center axis, dividing each bore into a first section, with a large bore diameter, and a second section, with a smaller bore diameter.

Figure 4:
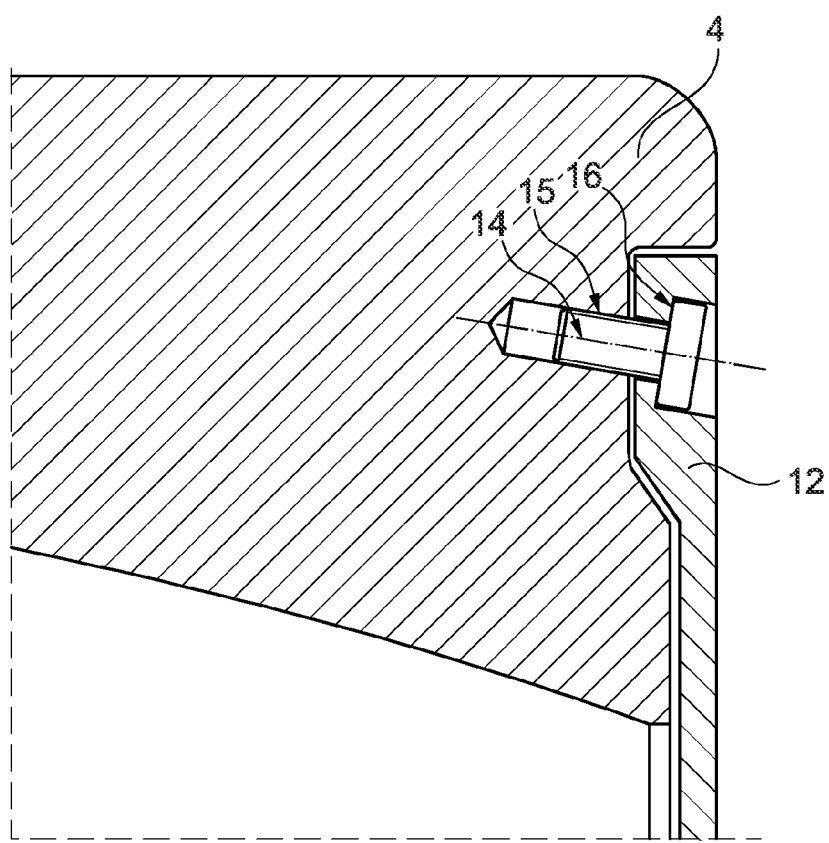
FIG. 4 shows a section through the bore region clarifying a further exemplary embodiment.

FIG. 4 shows a further embodiment of the sealing disc fastening in a detailed sectional view, wherein the sealing arrangement 11 rests on the sealing disc support section 12 in a recess on the outer ring 4.

LIST OF REFERENCE NUMERALS

01 Bearing
02 Axis of rotation
03 Inner ring
04 Outer ring
05 Rolling element chamber
06 Rolling elements
07 Cage
08 Central rim
09 Lateral rim
10 Raceway
11 Sealing arrangement
12 Seal support section
13 Lubrication bore
14 Cylindrical fastening means
15 Bore
16 Collar

The invention claimed is:

1. A bearing ring of a roller bearing, comprising:
an outer annular surface;
an inner annular surface;
two end surfaces;
an annular sealing disc connected to one of the two end surfaces;
fasteners, each including a shank and a head, which has an enlarged diameter with respect to the shank, and respective ones of the shanks extend through bores in one of the end surfaces and the sealing disc connected thereto;

wherein the outer annular surface has a cylindrical contour and the inner annular surface provides a raceway having a spherical contour, and a bore center axis of each said bore in one of the end surfaces and in the sealing disc has an engaged profile which converges towards the cylindrical contour while extending into the end surface; or wherein the outer annular surface includes a spherical contour and the inner annular surface includes a cylindrical contour, and a bore center axis of each said bore in one of the end surfaces and in the sealing disc has an engaged profile which diverges from the cylindrical contour while extending into the end surface.

2. The bearing ring according to claim 1, wherein a radial distance between the bore center axis and the spherical contour is essentially a same size along an entire length of the bore.

3. The bearing ring according to claim 1, wherein the fasteners are screws and the bores in the end surface are threaded bores.

4. The bearing ring according to claim 1, wherein the bores in the sealing disc are provided with a collar which extends radially relative to the bore center axis and forms an angle of 90° with the bore center axis, each said collar divides each said bore into a first section and a second section, the first section having a larger bore diameter than the second section.

5. A self-aligning roller bearing, comprising: the bearing ring according to claim 1.

6. A bearing ring of a roller bearing, comprising:
an outer annular surface;
an inner annular surface;
two end surfaces;
a respective annular sealing disc connected to each of the two end surfaces;
fasteners, each including a shank and a head, which has an enlarged diameter with respect to the shank, and respective ones of the shanks extend through bores in each of the end surfaces and the respective sealing disc connected thereto;

wherein the outer annular surface has a cylindrical contour and the inner annular surface provides a raceway having a spherical contour, and a bore center axis of each said bore in one of the end surfaces and in the sealing disc has an engaged profile which converges towards the cylindrical contour while extending into the end surface; or wherein the outer annular surface includes a spherical contour and the inner annular surface includes a cylindrical contour, and a bore center axis of each said bore in one of the end surfaces and in the sealing disc has an engaged profile which diverges from the cylindrical contour while extending into the end surface.

7. The bearing ring according to claim 6, wherein a radial distance between the bore center axis and the spherical contour is essentially a same size along an entire length of the bore.

8. The bearing ring according to claim 6, wherein the fasteners are screws and the bores in the end surfaces are threaded bores.

9. The bearing ring according to claim 6, wherein the bores in the sealing discs are each provided with a collar which extends radially relative to the bore center axis and forms an angle of 90° with the bore center axis, said collar divides each said bore into a first section and a second section, the first section having a larger bore diameter than the second section.

* * * * *